United States Patent Office 3,065,183
Patented Nov. 20, 1962

3,065,183
POLYPHOSPHONATE-PHOSPHINATE ESTERS AND PROCESS FOR MAKING SAME
Samuel C. Temin, Pittsburgh, Pa., assignor to Koppers Company, Inc., a corporation of Delaware
No Drawing. Filed Apr. 18, 1962, Ser. No. 188,559
6 Claims. (Cl. 252—78)

This invention relates to water-soluble organic compounds of pentavalent phosphorus. In one specific aspect, it relates to a novel class of triphosphonates and the method for preparing same. In another aspect it relates to a novel class of water-soluble phosphorus polyesters and to the method of their preparation.

I have found that these water-soluble phosphorus esters and polyesters make excellent flame retardants for cellulosic material, such as cotton fabric, wood and paper. Aqueous solutions of these novel compounds were found to be especially useful as non-flammable hydraulic fluids. Other uses include antistatic agents for plastics, sequestering agents and plasticizers.

It is an object of the present invention to provide a water-soluble, flame retardant organophosphorus compound which can be bound chemically to the substrate. Another object of the invention is to provide novel water-soluble phosphonate diesters. A further object of the invention is to provide water-soluble phosphorus polyesters having a plurality of phosphonate-phosphinate alternating linkages.

In accordance with my invention, I have discovered novel water-soluble pentavalent phosphorus diesters having the formula:

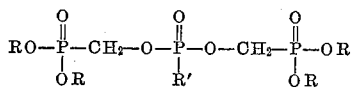

wherein R is a member selected from the group consisting of hydrogen and lower alkyl and R' is a member selected from the group consisting of lower alkyl, halo lower alkyl, cycloalkyl of 5–6 carbon atoms, phenyl, halophenyl, alkaryl of up to 8 carbon atoms and aralkyl of up to 8 carbon atoms. The new diesters are made by reacting at a temperature of 25–150 C. a phosphonic acid of the formula:

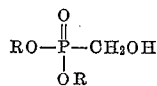

wherein R is as defined above, with a compound of the formula:

wherein R' is as defined above and X is halogen.

I have also discovered a water-soluble poly(phosphonate-phosphinate) of the formula:

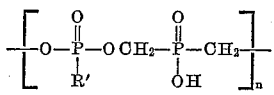

wherein R' is a member selected from the group consisting of cycloalkyl of 5–6 carbon atoms, lower alkyl, halo lower alkyl, phenyl, halophenyl, alkaryl of up to 8 carbon atoms and aralkyl of up to 8 carbon atoms and $n$ is an integer having a value of at least three. The method of making this polymer comprises reacting at a temperature of 25–150° C. a phosphinic acid of the formula:

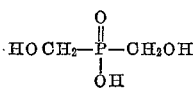

with a phosphonic dihalide of the formula:

where R' is as defined above and X is halogen.

For preparing the diesters useful phosphonic acids include hydroxymethylphosphonic acid, dimethyl hydroxymethylphosphonate, diethyl hydroxymethylphosphonate, and monomethyl hydroxymethylphosphonate.

Useful phosphonic dihalides are those of the formula:

including methylphosphonic dichloride, ethylphosphonic dibromide, isopropylphosphonic diiodide, butylphosphonic difluoride, cyclohexylphosphonic dichloride, chloromethylphosphonic dichloride, bromomethylphosphonic dibromide, phenylphosphonic dichloride, p-chlorophenylphosphonic dichloride, 2,4-dichlorophenylphosphonic dichloride, p-bromophenylphosphonic dibromide, trichloromethylphosphonic dichloride, p-tolylphosphonic dichloride, 2,4-dimethylphenylphosphonic dichloride, nitromethylphosphonic dichloride, p-nitrophenylphosphonic dichloride, p-methoxyphenylphosphonic dichloride, p-chlorobenzylphosphonic dichloride, 2-chloro-4-bromophenylphosphonic dichloride, benzylphosphonic dichloride, 2-methoxyethylphosphonic dichloride and 4-ethoxybutylphosphonic dichloride.

The temperature at which the diesters are prepared is between 20° to 200° C. At temperatures below 20° C. the reaction takes place too slowly, whereas at temperatures much above 200° C., decomposition may occur. The preferred temperature range is between 60° C. to 120° C. whereby the reaction proceeds at a reasonable rate.

The reaction may be conducted at atmospheric pressure, although reduced pressures are desirable to facilitate removal of the volatile by-product, hydrogen chloride. The reduced pressure used should be such that neither of the reactants is volatile at the temperature used. Thus, if phenylphosphonic dihalide is used and a corresponding reaction temperature of about 110° C. maintained, then the pressure should not be below about 30 mm. Hg during the first part of the reaction.

Generally the reaction takes place readily in the absence of an inert diluent or catalyst. However, catalysts, diluents or solvents may be employed. If a solvent is used, it is necessary that the product be separated from the solvent, usually by volatilization of the solvent.

The phosphonate diesters are usually characterized by solubility in water and methanol and insolubility in benzene, gasoline, carbon tetrachloride and other oil solvents. The diesters are further characterized by high viscosity at room temperature with no tendency to crystallize.

For preparing the polymers, bis(hydroxymethyl)phosphinic acid is used in conjunction with the phosphonic dihalide as previously defined. Homologues in which the hydroxymethyl groups (i.e. —$CH_2OH$) are replaced by higher hydroxy alkyl groups (i.e. —CHROH) have not produced the novel water-soluble polymers.

Polymerization to form the phosphonate-phosphinate occurs under the same conditions of temperature and pressure as given above in the preparation of the diesters. The chain length of the polyphosphonate-phosphinate is determined by the stoichiometry or molar ratios of the reactants. Higher molecular weight products are obtained by avoiding excess of either reactant and carefully purifying these same reactants. Further, higher molecular weights are formed by the use of lower subatmospheric pressures during the reaction. The degree of polymerization represented by the symbol "$n$," has a minimum value of 3 and a maximum value of about 100. By controlling the value of "$n$," a polymer having a molecular weight of over 550 to about 25,000 may be obtained. The polymer thus produced is generally characterized by the properties of solubility in water and polar solvents, insolubility in hydrocarbons, high viscosity at room temperature and no tendency to crystallize at room temperature.

My invention is further illustrated by the following examples:

EXAMPLE I

*Bis(Phosphonomethyl)Chloromethyl Phosphonate*

To a three-neck flask, fitted with a mechanical stirrer, dropping funnel and outlet tube, was added 112 g. of hydroxymethylphosphonic acid. The flask was heated by means of an oil bath maintained at 110° and, under continuous stirring, 84 g. of chloromethylphosphonic dichloride were gradually added from the dropping funnel. During the reaction, hydrogen chloride gas was evolved. After two hours, the outlet tube was connected to a vacuum source and the melt was heated to about 110° C. and under a reduced pressure (20 mm. of mercury) for an additional two hours. The yield of bis(phosphonomethyl)chloromethylphosphonate obtained was 159 g. The product was a viscous liquid, $n_D^{22.5}$, 1.5050. Elemental analyses were as follows:

| Element | Found (Percent) | Calc'd for $C_3H_{10}O_9P_2Cl$ (Percent) |
| --- | --- | --- |
| C | 11.3 | 11.3 |
| H | 3.3 | 3.1 |
| P | 29.6 | 29.2 |

EXAMPLE II

*Bis(Phosphonomethyl)Phenylphosphonate*

In an apparatus similar to that described in Example I, 81 g. of hydroxymethylphosphonic acid was heated and stirred at 115° C. and at a pressure of 30 mm., while 73.5 g. of phenylphosphonic dichloride were added over a period of two hours. The product, 128 g. was a colorless syrup which barely flowed at room temperature. Elemental analyses were as follows:

| Element | Found (Percent) | Calc'd for $C_8H_{13}P_3O_9$ (Percent) |
| --- | --- | --- |
| C | 28.3 | 27.8 |
| H | 3.9 | 3.8 |
| P | 27.7 | 26.9 |

The infrared spectrum was consistent with that of the triphosphonate compound.

EXAMPLE III

*Bis(Diethylphosphonomethyl)Phenylphosphonate*

To 19.4 g. of diethyl hydroxymethylphosphonate, $HOCH_2-P(O)(OC_2H_5)_2$, prepared from the reaction of formaldehyde with diethyl hydrogen phosphite, was added 11.3 g. of phenylphosphonic dichloride over a period of 30 minutes. The temperature of the reaction was maintained at about 60° C. The mixture was stirred while gaseous hydrogen chloride was evolved. After two hours, the vessel containing the reaction mixture was connected to a vacuum source and a pressure of 20 mm. maintained for two hours. The product was then subjected to a temperature of 100° C. and a pressure of 1 mm. for one hour to remove volatiles. The clear, viscous liquid product remaining (25 g.) gave an elemental analysis conforming to the calculated value for $C_{16}H_{29}O_9P_3$. The ester was soluble in methanol and water and insoluble in ether and benzene.

EXAMPLE IV

*Bis(Phosphonomethyl)N,N-Dimethyl Phosphoramidate*

In an apparatus similar to that of Example I, was placed 37.5 g. of hydroxymethylphosphonic acid. The contents of the flask were heated to 100° C. and stirring of the melt begun. Then, to the stirred mass, was added 27.1 g. of N,N-dimethyl phosphoramidic dichloride over a period of 15 minutes. A vigorous reaction ensued and the temperature of the reaction mass rose to 140° C. The evolution of hydrogen chloride gas commenced at once. After 30 minutes at 140° C. the melt appeared free of bubbles and a vacuum (20 mm. pressure) was applied to the contents of the flask. The temperature was lowered to 110° C. and the reaction mass was kept at this temperature under the reduced pressure for 75 minutes. The viscous, clear liquid was poured hot into a jar. The yield of product, which did not flow at room temperature, was 46 g. Elemental analyses gave values of 29.4% phosphorus and 4.3% nitrogen compared to the values calculated for a compound of the empirical formula $C_4H_{14}O_9P_3N_1$ of 29.7% phosphorus and 4.5% nitrogen.

EXAMPLE V

*Poly[Phosphinico Bis(Methyl)]Phenylphosphonate*

In an apparatus similar to that described in Example I, 50.4 g. of bis(hydroxymethyl)phosphinic acid was heated to a temperature of 100° C. To the acid was added, with stirring, over a period of one hour, 78.0 g. of phenylphosphonic dischloride. The temperature was then raised to 150° C. and the pressure reduced to 20 mm. After three hours, a slightly amber, viscous liquid was obtained which on cooling became a stiff semi-solid material. The yield was 95 g. Infrared analysis corresponded to a polymer with the structure:

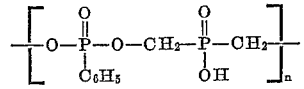

The fluid had $n_D^{22}$, 1.530. It analyzed 24.6% phosphorus compared with a calculated value of 25.0%.

EXAMPLE VI

*Poly[Phosphonico Bis(Methyl)]Chloromethylphosphonate*

To 64.4 g. of bis(hydroxymethyl)phosphinic acid, maintained at 110° C., was gradually added 84.4 g. of chloromethylphosphonic dichloride. The mixture was stirred thoroughly. After two hours at atmospheric pressure, the reaction vessel was connected to a vacuum source and the heating and stirring continued at 20 mm. pressure for two additional hours. The temperature was then raised to 150° C. and the pressure lowered to 1 mm. After one hour there was obtained 130 g. of a colorless viscous polymer, $n_D^{23}$, 1.5029. Infrared analysis confirmed the structure as a polymer of the formula:

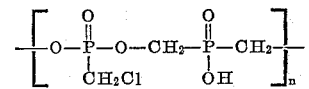

The polymer contains, by elemental analysis, 27.7% phosphorus, which corresponds to the calculated value of 28.1% for $C_3H_7O_5P_2Cl$.

EXAMPLE VII

Use of bis(phosphonomethyl)chloromethylphosphonate as a flame retardant. A 10% aqueous treating solution was prepared containing 166 g. bis(phosphonomethyl) chloromethylphosphonate, 30 g. triethanolamine, 95 g. melamine-formaldehyde resin, 100 g. urea, and 610 g. water. The solution was applied to cotton fabric which was dried and cured for 4.5 minutes at 280° F. Then the fabric was rinsed, washed, and dried. Tests of the treated fabric showed that it exhibited good flame retardancy and that the flame retardancy was not destroyed by repeated washings.

EXAMPLE VIII

The Effect on Fire-Resistance Imparted to Wood

A 15% aqueous solution of bis(phosphonomethyl) chloromethylphosphonate was applied to southern yellow pine. The percent retention of the triphosphonate, based on the oven dried weight of the wood, was 20%. Using the conventional fire tube apparatus (ASTM E69–50) the percent weight loss on burning was found to be 22%. In a similar test with poly[phosphinico bis (methyl)]chloromethylphosphonate the weight retention was again 20% and the percent weight loss (ASTM E69–50) was only 18%. A value of only 18% weight loss approaches a fire retardant classification of "excellent."

EXAMPLE IX

The Effect on Fire-Resistance Imparted to Paper

A weighed sheet of filter paper was treated with a 10% methanolic solution of poly[phosphinico bis(methyl)] phenylphosphonate and then oven dried. The increase in weight showed that the retention of polymer was 11% based on the original weight of the paper.

The paper no longer supported combustion when a match was applied to it. Similarly the paper was held in the flame of a Bunsen burner and, on removal, the flame was self-extinguishing.

This example and the prior example show the excellent flame retardance imparted to cellulosic material. The foregoing results are obtained when the cellulosic material is impregnated with from one to twenty percent of the organic phosphorus compounds of the present invention

EXAMPLE X

Corrosion Resistance (ST-675-258)

Twenty gram samples of bis(phosphonomethyl)N,N-dimethylphosphoramidate were placed in each of three test tubes containing (standard corrosion test) strips of metals. One tube contained aluminum, another copper, and a third steel. The tubes were kept for twenty hours at 70° C. and then an additional five days at room temperature. There was no weight loss or evidences of corrosion.

EXAMPLE XI

Preparation of Aqueous Hydraulic Fluids

Aqueous solutions containing 80% by weight of phosphorus compound were prepared from bis(phosphonomethyl)chloromethylphosphonate (I) and poly[phosphinico bis(methyl)chloromethylphosphonate] (II). It was surprising to note that some of these samples remained liquid, although extremely viscous, even at −78° C. The viscosities of these two aqueous solutions were then measured at various temperatures, as shown in the table below:

TABLE I

| Temperature (° C.) | Viscosity in Centistokes of Solutions Containing— | |
| --- | --- | --- |
|  | I | II |
| −20 | 5,520±250 |  |
| 38 | 76±1.2 | 2,425±65 |
| 100 | 11.32±0.45 | 76±6.0 |
| 150 |  | 18.3±1.5 |

Less viscous fluids were also prepared using more dilute, e.g. 70% and 50% aqueous solutions of bis-phosphonomethyl)N,N-dimethylphosphoramidate, as shown in the table below.

TABLE II

| Temperature (° C.) | Centistokes | | Mil [1] |
| --- | --- | --- | --- |
|  | 50% | 70% |  |
| 15 | 9.49 | 58.53 |  |
| 38 | 4.60 | 22.61 |  |
| 100 | 1.46 | 4.98 | 14–23 5–9 |

[1] USAF specification for a fire-resistant fluid.

The data indicate that by choice of phosphorus compounds and by variation of the concentration in solution, almost any desired fluid viscosity can be obtained to suit a particular purpose. At an approximately 70% aqueous solution of the phosphonate diester, a fire retardant hydraulic fluid conforming to military specifications may be prepared.

EXAMPLE XII

Poly(Phosphonate-Phosphinate) as Sequestering Agent

A one ml. portion of an iron standard solution (0.1 mg./ml.) was added to each of two 100 ml. volumetric flasks. To these solutions, one ml. of 0.1 N potassium thiocyanate solution was added to develop the red-colored complex. To one of the flasks, 5 ml. of one percent aqueous solution of poly[phosphinico bis(methyl)] phenylphosphonate was added. The red color disappeared in two minutes. This indicates that the ferrous complex with the polymer was more stable than with thiocyanate ion.

EXAMPLE XIII

Solubility of Poly[Phosphinico(Methyl)]Phenylphosphonate in Benzene

A seventeen gram sample of the polymer was placed in a glass-stoppered flask with 250 ml. of benzene and shaken on a wrist-action shaker for six hours. The supernatant benzene was decanted and analyzed for phosphorus. The benzene solution was found to contain less than 0.05% phosphorus. Similar results are obtained with xylene, pentane, cyclohexane, chlorobenzene, methylnaphthalene, carbon tetrachloride and gasoline.

I claim:

1. A method of making organic water-soluble pentavalent phosphorus diesters having the formula:

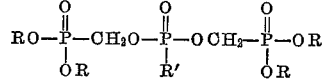

wherein R is a member selected from the group consisting of hydrogen and lower alkyl and R' is a member selected from the group consisting of lower alkyl, halo lower alkyl, cycloalkyl of 5–6 carbon atoms, phenyl, halophenyl, alkaryl of up to 8 carbon atoms, and aralkyl of up to 8 carbon atoms, comprising reacting, at a temperature of 25°–150° C., a phosphonic acid of the formula:

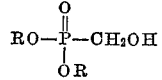

wherein R is as defined above with a phosphonic dihalide of the formula:

wherein R' is as defined above and X is halogen.

2. A method according to claim 1, wherein the molar ratio of phosphonic acid to phosphonic dihalide is substantially two to one.

3. A method of making a water-soluble poly(phosphonate-phosphinate) of the formula:

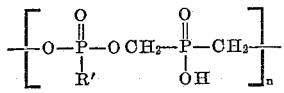

wherein R' is a member selected from the group consisting of lower alkyl, halo lower alkyl, cycloalkyl of 5–6 carbon atoms, phenyl, halo phenyl, alkaryl of up to 8 carbon atoms, and aralkyl of up to 8 carbon atoms, and $n$ is an integer having a value of at least 3, comprising reacting at a temperature of 25°–150° C. a phosphinic acid of the formula:

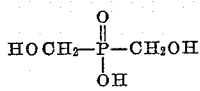

with a phosphonic dihalide of the formula:

wherein R' is as defined above and X is halogen.

4. A method according to claim 3 wherein the molar ratio of phosphinic acid to phosphonic dihalide is substantially one to one.

5. A water-soluble poly(phosphonate-phosphinate) of the formula:

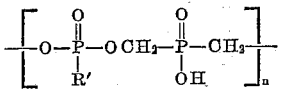

wherein R' is a member selected from the group consisting of lower alkyl, halo lower alkyl, cycloalkyl of 5–6 carbon atoms, phenyl, halo phenyl, alkaryl of up to 8 carbon atoms, and aralkyl of up to 8 carbon atoms, and $n$ is an integer having a value of at least 3.

6. A hydraulic fluid having a viscosity of 1–80 centistokes at 100° C. consisting essentially of the compound of claim 5 and water wherein the ratio of said compound to water is from 1:1 to 4:1.

References Cited in the file of this patent
UNITED STATES PATENTS

| | | |
|---|---|---|
| 2,330,254 | Whitehead | Sept. 28, 1943 |
| 2,448,090 | Fuhrman | Aug. 31, 1948 |
| 2,807,636 | Buls et al. | Sept. 24, 1957 |
| 2,909,559 | Lanham | Oct. 20, 1959 |
| 3,042,700 | Birum | July 3, 1962 |
| 2,042,702 | Birum | July 3, 1962 |